United States Patent [19]

Mori

[11] Patent Number: 4,572,161
[45] Date of Patent: Feb. 25, 1986

[54] SOLAR RAY COLLECTOR DEVICE

[76] Inventor: Kei Mori, 3-16-3-501, Kaminoge, Setagaya-Ku, Tokyo, Japan

[21] Appl. No.: 621,588

[22] Filed: Jun. 18, 1984

[30] Foreign Application Priority Data

Jun. 24, 1983 [JP] Japan .................. 58-114767

[51] Int. Cl.⁴ ............................. F24J 3/02
[52] U.S. Cl. .................. 126/440; 126/424; 126/443
[58] Field of Search ........... 126/424, 443, 425, 440, 126/450; 353/3; 350/522, 254; 136/246, 244

[56] References Cited

U.S. PATENT DOCUMENTS

| | | | |
|---|---|---|---|
| 603,317 | 5/1898 | Calver | 126/424 |
| 2,803,591 | 8/1957 | Coànda et al. | 126/424 X |
| 4,068,653 | 1/1978 | Bourdon et al. | 126/425 |
| 4,187,123 | 2/1980 | Diggs | 126/425 X |
| 4,205,661 | 6/1980 | Chapman | 126/425 |
| 4,282,858 | 8/1981 | Bowers, Jr. | 126/425 |
| 4,297,521 | 10/1981 | Johnson | 126/424 X |
| 4,340,812 | 7/1982 | Mori | 126/425 X |
| 4,425,905 | 1/1984 | Mori | 126/425 |

FOREIGN PATENT DOCUMENTS 14150 1/1982 Japan .................. 126/424

Primary Examiner—Randall L. Green
Attorney, Agent, or Firm—Jordan and Hamburg

[57] ABSTRACT

A solar ray collector device suitable for use in an equatorial zone is disclosed which includes a number of collector units mounted on a framework. The framework is angularly movable in the east-and-west direction about a shaft which extends in the north-and-south direction. Each of the collector units is rotatable about a shaft which is parallel to the shaft extending in the north-and-south direction. The framework is supported by a post which is rotatable about an axis thereof.

7 Claims, 7 Drawing Figures

SOLAR RAY COLLECTOR DEVICE

BACKGROUND OF THE INVENTION

The present invention relates to a solar ray collector device and, more particularly, to a solar ray collector which is suitable for use in an equatorial zone.

There has been proposed a solar collection system in which solar rays are converged by lenses or the like into a fiber optic cable so that the converged light may propagate through the cable to any desired location to serve a selected purpose, e.g. lighting. Such a system employs a solar sensor in order to sense the sun and directs the surfaces of the lenses on the sun throughout the day in response to an output of the solar sensor, thereby efficiently introducing solar radiation into the fiber optic cable.

A prior art solar collector device includes a number of lenses which are bundled up by a frame with a solar sensor mounted thereon. The lens assembly is rotatable about a first axis and a second axis which extends perpendicular to the first axis. The lens assembly and a drive mechanism associated therewith are encapsulated in a transparent dome-shaped housing. In operation, the lens assembly is moved about the first and second axes in response to an output of the solar sensor so that its light receiving surface is constantly directed sunward. The light converged by the lenses may be transmitted by a fiber optic cable to any desired place.

Designed for use in all the areas on the earth, the solar collector device described above requires the dome-shaped or spherical housing and the lens assembly is constructed to have a generally circular contour to match with such a configuration of the housing. The construction, however, will become more effective if exclusive use of the solar collector in a specific area on the earth is contemplated. In an equatorial zone, for example, the solar collector will not need the spherical configuration of the housing inasmuch as the sun in that zone on the earth moves substantially from east to west throughout the year with hardly any change in position in the north-and-south direction. Right on the equator where the angular movement of the sun in the north-and-south direction occurs over ±23.5 degrees, solar rays directed from such a north-and-south angular range toward the solar collector will be admitted into the housing without being reflected by the surface of the housing even if the housing surface is positioned flat in a horizontal plane.

SUMMARY OF THE INVENTION

It is therefore an object of the present invention to provide a solar ray collector device which has an effective construction for use in a specific area on the earth.

It is another object of the present invention to provide a solar ray collector device which is suitable for operation in an equatorial zone.

It is another object of the present invention to provide a highly integrated, large-scale sollar ray collector device.

It is another object of the present invention to provide a generally improved solar ray collector device.

A solar ray collector device for use in an equatorial zone of the present invention comprises a post rotatable about a first axis, a framework mounted on an upper end portion of the post to be rotatable integrally with the post, the framework being angularly movable about a second axis which is perpendicular to the first axis and movable in parallel to a vertical plane which contains the first axis, and a plurality of collector units mounted on the framework such that each of the collector units is rotatable about an axis which is parallel to the second axis. The device is positioned such that vertical plane containing the first axis extends in the east-and-west direction and the second axis extends in the north-and-south direction.

In a specific embodiment of the present invention, each of the collector units comprises a multiplicity of lenses, light transmitting members each being aligned at one end thereof with a focal point of any of the lenses to receive light which is converged by the lens, and a transparent housing for covering surfaces of the lenses.

Preferably, the lenses in each of the collector units are arranged in a larger number in the north-and-south direction than in the east-and-west direction.

Desirably, the cover in each of the collector units is formed arcuately in the east-and-west direction and linearly in the north-and-south direction.

The above and other objects, features, and advantages of the present invention will become apparent from the following detailed description taken with the accompanying drawings.

DESCRIPTION OF THE PREFERRED EMBODIMENTS

While the solar collector device of the present invention is susceptible of numerous physical embodiments, depending upon the environment and requirements of use, substantial numbers of the herein shown and described embodiments have been made, tested and used, and all have performed in an eminently satisfactory manner.

Figure 1:
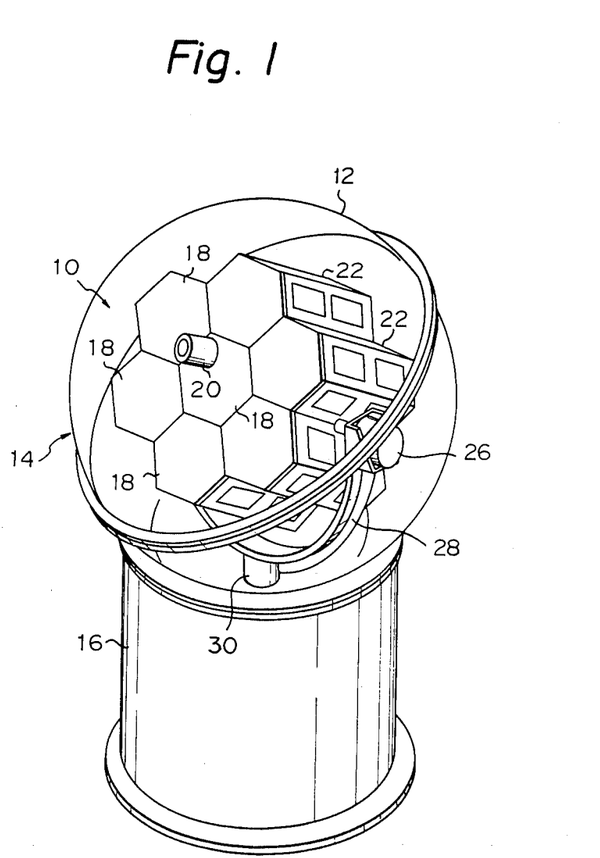
FIG. 1 is a perspective view of a prior art solar ray collector device.

To facilitate understanding of the present invention, a brief reference will be made to a prior art solar ray collector device, shown in FIG. 1. The solar ray collector device, or simply solar collector, comprises a lens assembly generally designated by the reference numeral 10. While in use, the lens assembly 10 is encapsulated in a transparent, generally dome-shaped head portion 12 which constitutes a housing 14 in combination with a generally cylindrical base portion 16.

The lens assembly 10 comprises a plurality of lenses 18 and a solar sensor 20 responsive to a position of the sun. The lenses 18 and solar sensor 20 are bundled up together by a frame 22. The number of the lenses 18 may be seven or nineteen, for example. The lens assembly 10 inclusive of the frame 22 is mounted on a shaft 24 which defines a first axis and is rotated by a first motor 26. A generally C-shaped arm 28 supports the lens assembly 10, shaft 24 and motor 26 and, in turn, is mounted on a shaft 30. The shaft 30 is rotated by a second motor (not shown) and defines a second axis which is perpendicular to the first axis.

In operation, the first and second motors are controlled in response to an output of the solar sensor 20 so that the lens assembly 10 tracks the sun throughout the day. The solar rays converged by the lenses 18 are introduced into optical fibers (not shown) which extend respectively from the focal points of the lenses to a desired location in a bundle. The light, therefore, is transmitted by the optical fibers to a desired location for lighting and other applications.

Figure 2:
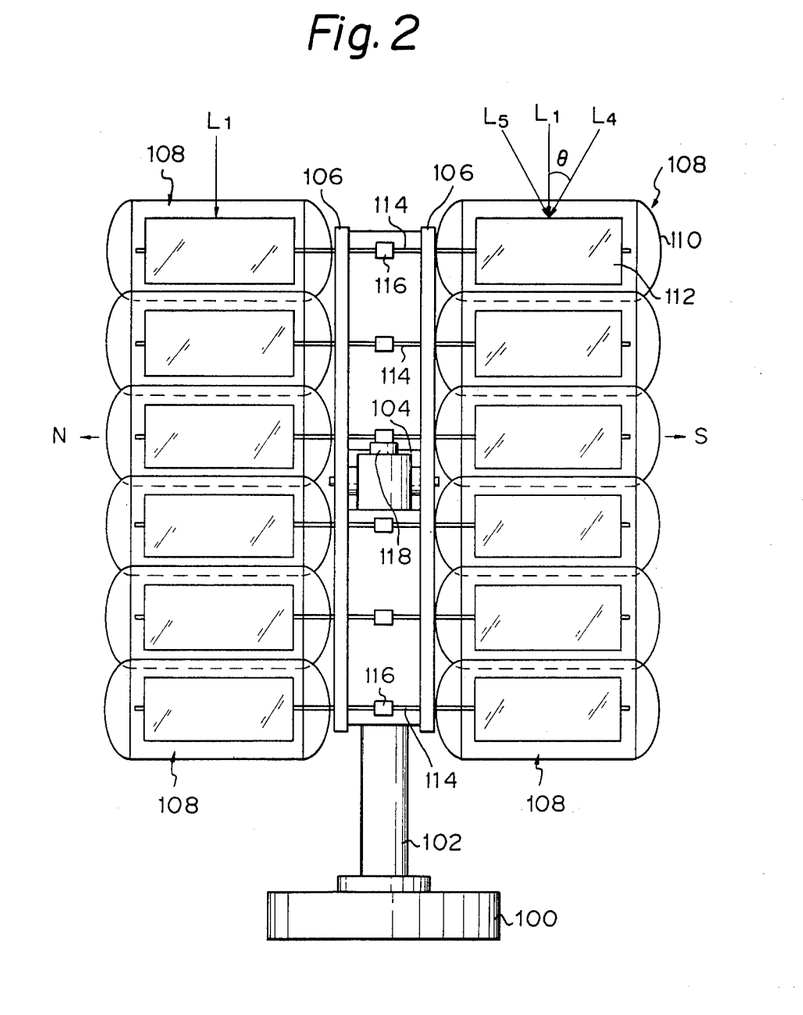
FIGS. 2-5 are different views of a solar ray collector device embodying the present invention.
Figure 3:
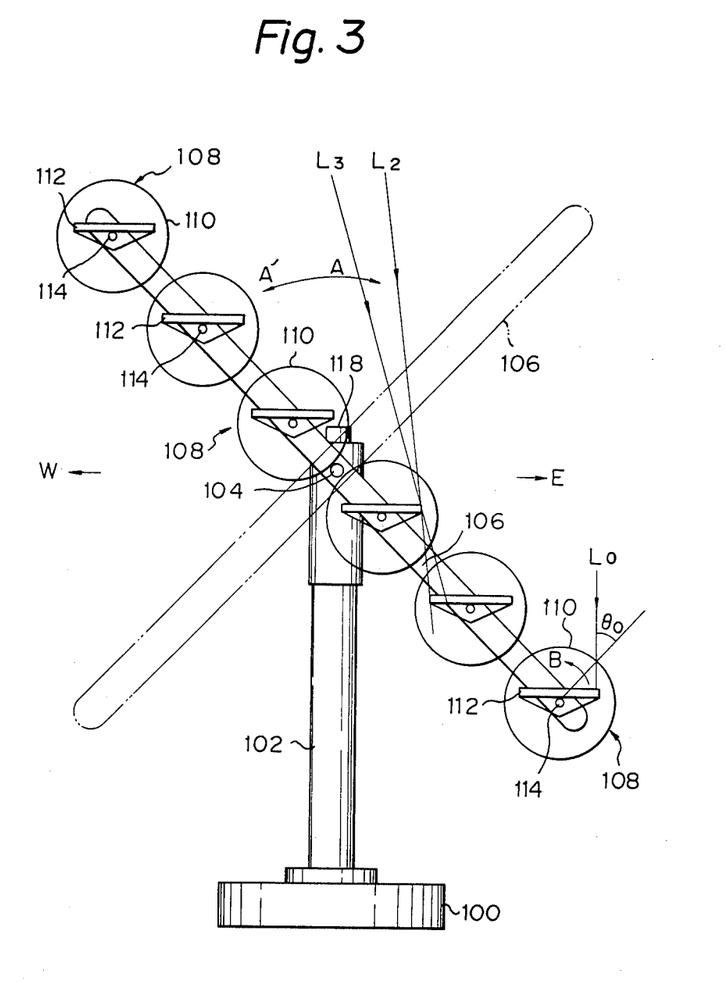
Figure 4:
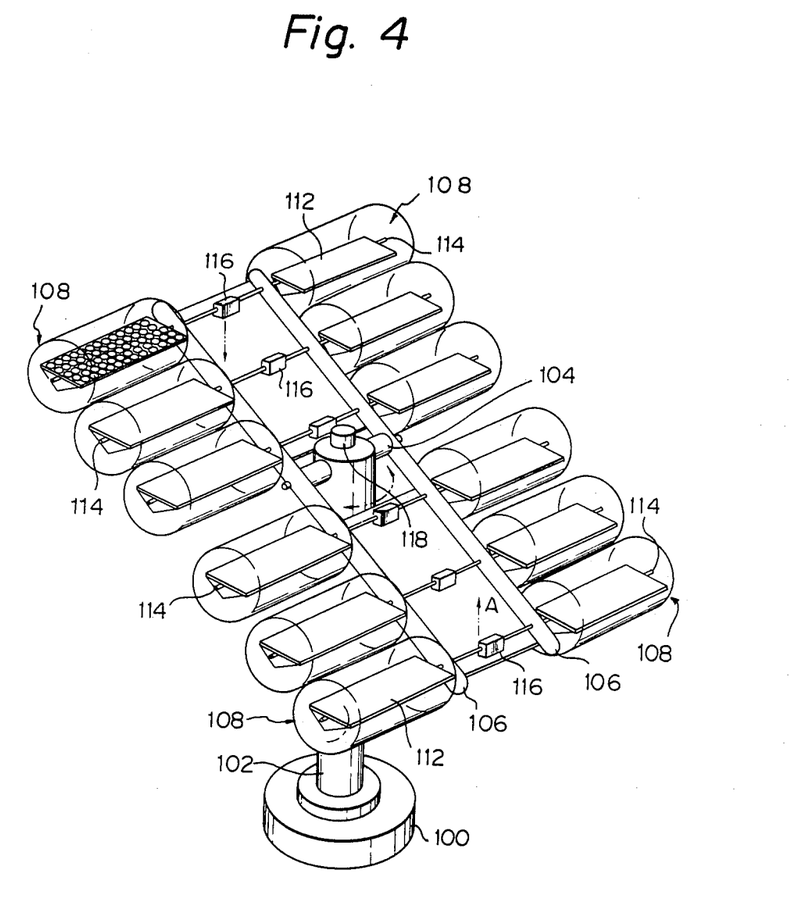
Figure 5:
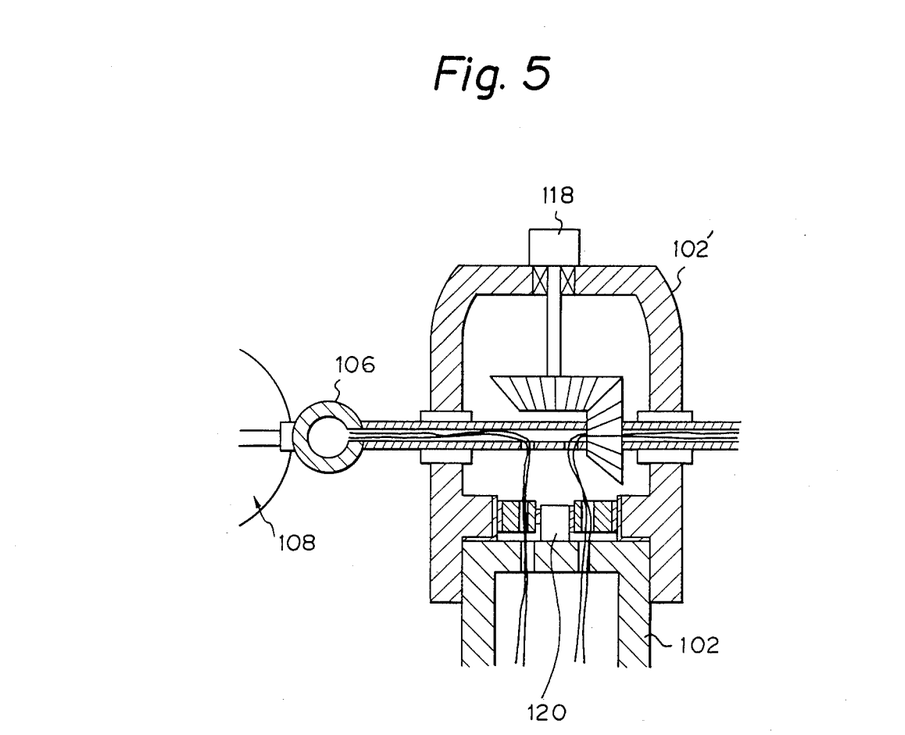

Referring to FIGS. 2-5, a solar collector device embodying the present invention is shown which achieves a more effective construction than the prior art device by limiting the application of the device to an equatorial zone by way of example. FIG. 2 is a front view seen either from the east or the west; FIG. 3 is a side elevation seen either from the north or the south; FIG. 4 is a perspective view; and FIG. 5 is a fragmentary section.

As shown, the solar collector in accordance with the present invention includes a pedestal 100 and a post 102 extending upright from the pedestal 100. A shaft 104 extends throughout an upper portion of the post 102 and is rotatable about an axis thereof. A framework 106 is mounted on the shaft 104 to be swingable as indicated by an arrow A integrally with the shaft 104. The framework 106 carries therewith a plurality of solar collector units 108.

Each solar collector unit 108 comprises a transparent housing 110 and a collector assembly 112 accommodated in the housing 110. The collector assembly 112 is made up of a number of lenses and light transmitting members which are arranged respectively at the focal points of the lenses. The collector assembly 112 is mounted on a shaft 114 which extends in the north-and-south direction and controllably rotated by a motor 116, so that the lens surfaces are directed eastward in the morning, upward at noon, and westward in the evening. In accordance with this particular embodiment, use is made of lenses each having a diameter smaller than about 4 centimeters and numerous such lenses are arranged in the collector assemblies 112, e.g. 2,000 lenses per collector assembly. Optical fibers each having a diameter of about 0.1–0.2 millimeters are accurately located such that their light receiving ends are positioned respectively at the focal points of the lenses. In this construction, solar radiation is converged by the respective lenses into their associated optical fibers. Lenses having such a small diameter and, therefore, a short focal length advantageously cuts down the overall thickness of the collector assembly 112.

The optical fibers associated with the lenses are laid in the shafts 114, shaft 104 and post 102 in this sequence. As previously described, the optical fibers transmit converged solar rays to a desired location to serve any desired purpose.

As already stated, the solar collector device in the illustrative embodiment is designed for operation specifically in an equatorial zone. Assuming the use right on the equator, for example, while the sun moves along the equator, the solar rays are incident to the housings 110 of the solar collector units 108 perpendicularly thereto as indicated by $L_1$ (FIG. 2). These solar rays are transmitted through the housing 110 of each solar collector unit 108 to reach the collector assembly 112 to be converged by the lenses of the assembly 112 into the optical fibers. Since the sun rises in the east and sets in the west as a matter of course, each of the shafts 114 is controllably rotated by the motor 116 to constantly orient the light receiving surfaces of its associated collector assemblies 112 sunward; at noon, the surfaces of all the collector assemblies 112 are positioned horizontal as shown in FIG. 3. Thereafter, as the sun moves further westward, the light receiving surfaces of the collector assemblies 112 are rotated as indicated by an arrow B (FIG. 3) following the movement of the sun. Such a movement of the sun is represented by rays $L_2$ and $L_3$ in FIG. 3. When the sunlight is incident on the device in the direction $L_3$, upper ones of the solar collector units 108 shade lower ones to prevent solar rays to reach the collector assemblies 112 of the latter. The solution to this problem in this particular embodiment is the provision of the rotatable shaft 104. Just before noon, a motor 118 associated with the shaft 104 is energized to rotate the shaft 104 and, thereby, the framework 106 bodily as indicated by an arrow A' in FIG. 3 to a position indicated by a phantom line. In such a position of the framework 106, all the collector assemblies 112 are allowed to collect solar radiation thereafter without shading each other.

The required angle of rotation of the shaft 104 for causing the above-described movement of the framework 106 is not more than about 90 degrees and, therefore, the rotation is easy. A solar ray $L_0$ incident to an end of the collector assembly 112 of each solar collector unit 108 constantly makes an angle $\theta_0$ between it and the surface of the housing 110. If the angle $\theta_0$ is selected to be smaller than about 45 degrees, for example, although dependent upon the material of the housing 110, the sunlight $L_0$ will be admitted into the housing 110 to be collected by the collector assembly 112 without being totally reflected by the surface of the housing 110.

Where the solar collector device in the illustrative embodiment is used right on the equator, it collects solar radiation without any problem so long as the sun moves along the equator. As well known, the sun moves between the tropics. Solar rays are incident on the solar collector in a direction $L_4$ as shown in FIG. 2 when the sun is on the tropic of Capricorn and in a direction $L_5$ when the sun is on the tropic of Cancer. In either case, the angle $\theta$ of incidence of the solar rays to the housing 110 is 23.5 degrees so that the sunlight will be safely introduced in the housing 110 even if the housing surface is positioned horizontal. This enables the housing 110 to have a cylindrical configuration which extends in the north-and-south direction as illustrated, thereby realizing the illustrated construction and arranement of the solar collector unit 108.

Nevertheless, unless the light receiving surface of the collector assembly 112 in each unit 108 is constantly directed on the sun, the light converged by each lens fails to be focused to the light receiving end of the optical fiber associated with the lens and, resulting inefficient introduction of the light in the optical fiber. In this particular embodiment, such a problem is solved by constructing a part of the post 102 rotatable. As shown in FIG. 5, a hollow support member 102' is movably mounted on top of the post 102 and driven by a motor 120 in an rotational motion. It should be noted, however, that the post 102 and the rotatable support member 102' may alternatively be formed integrally with each other to be rotatable as a single member.

Figure 6:
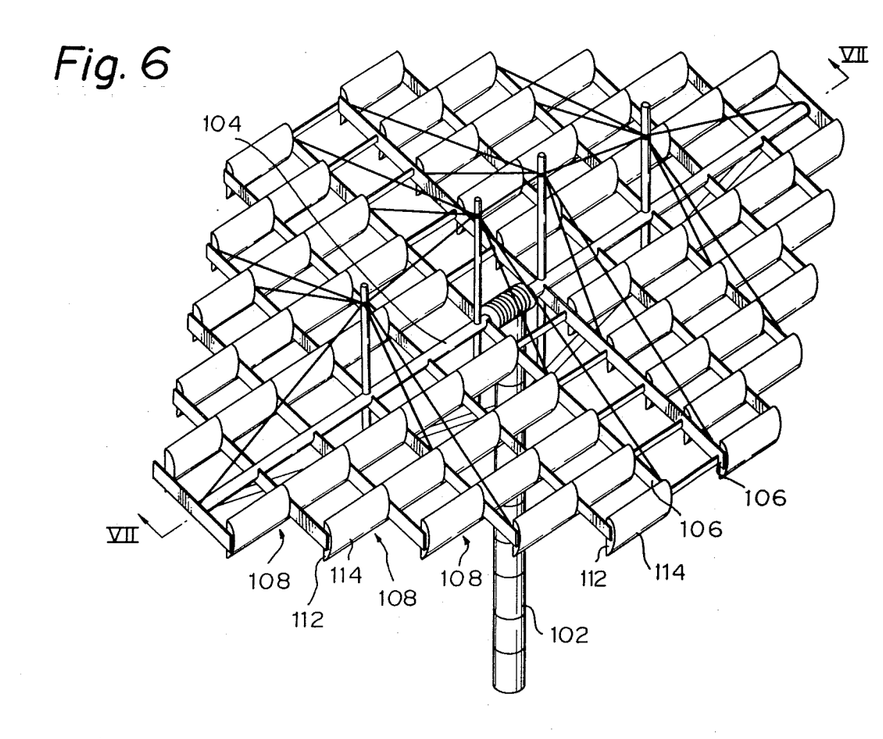
FIG. 6 is a perspective view of another embodiment of the present invention.
Figure 7:
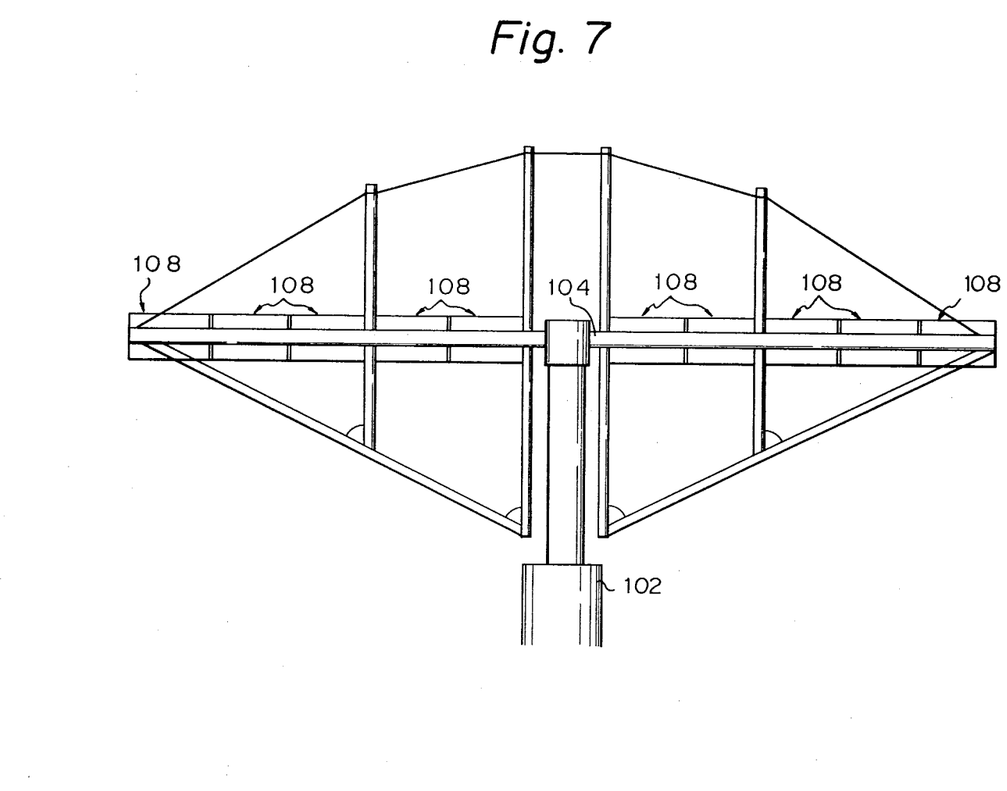
FIG. 7 is a sectional front view taken along line XII—XII of FIG. 6

Referring to FIGS. 6 and 7, another embodiment of the solar collector device of the present invention is shown. In these drawings, the structural elements common or similar to those shown in FIGS. 2-5 are designated by the same reference numerals. In this particular embodiment, the housing 110 and the collector assembly 112 in each collector unit 108 are constructed integrally with each other so that the former is rotatable together with the latter about its associated shaft 114. In this construction, the housing 110 has the same surface constantly directed sunward and such makes it possible to employ, for example, a semicircular cross-section for the housing 110, instead of cylindrical one shown and described in relation with the first embodiment. Such a housing configuration facilitates integration of numerous solar collector units in a single solar collector device and, thereby, production of a device having a larger scale. Again, those solar collector units 108 which are mounted on the same rotary shaft 114 are controllably rotated by a common motor to constantly maintain their lens surfaces sunward. Also, each optical fiber extends through the shaft 104, framework 106 and post 102 to a desired location.

In summary, it will be seen that the present invention provides a solar collector device which effectively operates for sollar collection specifically in an equatorial zone.

Various modifications will become possible for those skilled in the art after receiving the teachings of the present disclosure without departing from the scope thereof.

What is claimed is:

1. A solar ray collector device for use in a equatorial zone comprising a post rotatable about a first axis, means for rotating said post, a framework, framework mounting means mounting said framework on said post, said framework mounting means comprising a shaft rotatable about a second axis which is perpendicular to said first axis, said shaft being mounted on said post so that said shaft rotates with said post about said first axis, said framework being mounted on said shaft to provide for rotation of said framework about said second axis, said first axis being a vertical axis and said second axis extending in a north-and-south direction, framework drive means for rotating said framework about said second axis, a plurality of collector units mounted on said framework, each of said collector units having a transparent housing and a collector assembly mounted in said housing, rotatable mounting means mounting each of said collector assemblies on said framework for rotation about collector axes parallel to said second axis, collector drive means for rotating said collector assemblies about said collector axes, said transparent housings each having at least a partial cylindrical configuration with the axis of the cylinder extending parallel to said second axis, the sunlight being admitted into said housing to be collected by said collector assemblies without being totally reflected by the surface of said housing, said collector drive means rotating said collector assemblies about said collector axes to direct said collector assemblies toward the sun as the latter passes overhead from east to west, said framework drive means rotating said framework about said second axis to allow said collector devices to collect solar rays without shading one another, whereby, when used in an equatorial zone, solar rays of the equatorial zone sun will be admitted into said housing without being reflected by the surface of the housing even when said axes of said at least partial cylindrical surfaces are disposed horizontally in a north-and-south direction.

2. A solar ray collector device according to claim 1, wherein said housing has a semicircular cross-sectional configuration.

3. A solar ray collector device according to claim 1, wherein said housing has a cylindrical configuration.

4. A solar ray collector device according to claim 1, wherein each of said collector assemblies comprises a plurality of lenses, light transmitting members each aligned at one end thereof at a focal point of said plurality of lenses to receive light which is converged by said lens, said housing covering the surfaces of said lenses.

5. A solar ray collector device according to claim 4, wherein said light transmitting members pass through longitudinal passages in said post and in said shaft, and further comprising a collector shaft on which said collector assemblies are mounted, said light transmitting members passing through longitudinal passages in said collector shafts.

6. A solar ray collector device according to claim 1, wherein said housing and said collector assembly of each of said collector units are joined together as a unit so that said housing and collector assembly rotate together as a unit.

7. A solar ray collector device for use in an equitorial zone comprising a post rotatable about a first axis, means for rotating said post, a framework, framework mounting means mounting said framework on said post, said framework mounting means comprising a shaft rotatable about a second axis which is perpendicular to said first axis, said shaft being mounted on said post so that said shaft rotates with said post about said first axis, said framework being mounted on said shaft to provide for rotation of said framework about said second axis, said first axis being a vertical axis and said second axis extending in a north-and-south direction, framework drive means for rotating said framework about said second axis, a plurality of collector units mounted on said framework, each of said collector units having a transparent housing and a collector assembly mounted in said housing, rotatable mounting means mounting each of said collector assemblies on said framework for rotation about collector axes disposed parallel to said second axis, collector drive means for rotating said collector assemblies about said collector axes, said transparent housings each having a cylindrical configuration with the axis of the cylinder extending parallel to said second axis, the sunlight being admitted into said housing to be collected by said collector assemblies without being totally reflected by the surface of said housing, said collector drive means rotating said collector assemblies about said collector axes to direct said collector assemblies toward the sun as the latter passes overhead from east to west, said framework drive means rotating said framework about said second axis to allow said collector devices to collect solar rays without shading one another, whereby, when used in an equatorial zone wherein the angular movement of the sun relative to the north-and-south direction is at a minimum, solar rays directed from such a north-and-south angular range toward the solar collector will be admitted into said housing without being reflected by the surface of the housing even when said axes of said at least partial cylindrical surfaces are disposed horizontally in a north-and-south direction.

* * * * *